(12) United States Patent
Honda

(10) Patent No.: US 8,339,073 B2
(45) Date of Patent: Dec. 25, 2012

(54) SHAPE MEMORY ALLOY DRIVER

(75) Inventor: Yasuhiro Honda, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 288 days.

(21) Appl. No.: 12/745,283

(22) PCT Filed: Nov. 25, 2008

(86) PCT No.: PCT/JP2008/071293
§ 371 (c)(1),
(2), (4) Date: May 28, 2010

(87) PCT Pub. No.: WO2009/069574
PCT Pub. Date: Jun. 4, 2009

(65) Prior Publication Data
US 2010/0320943 A1    Dec. 23, 2010

(30) Foreign Application Priority Data
Nov. 30, 2007 (JP) .................................. 2007-310890

(51) Int. Cl.
*H02N 10/00* (2006.01)
(52) U.S. Cl. ........................................ 318/117; 310/306
(58) Field of Classification Search ............... 318/116, 318/117; 310/306, 307, 317
See application file for complete search history.

(56) References Cited

U.S. PATENT DOCUMENTS

| 4,579,006 | A | * | 4/1986 | Hosoda et al. ........... 73/862.381 |
| 4,977,886 | A | * | 12/1990 | Takehana et al. ............. 600/151 |
| 7,294,102 | B2 | | 11/2007 | Jones |
| 7,886,535 | B2 | | 2/2011 | Matsuki |
| 2001/0025477 | A1 | * | 10/2001 | Hara et al. .................... 60/39.02 |
| 2006/0148296 | A1 | | 7/2006 | Zanella et al. |

FOREIGN PATENT DOCUMENTS

| JP | 2001-227454 A | 8/2001 |
| JP | 2003-131106 A | 5/2003 |
| JP | 2003-136495 A | 5/2003 |
| JP | 2006-189045 A | 7/2006 |
| WO | WO 2009/069574 A1 | 6/2009 |

\* cited by examiner

*Primary Examiner* — Derek Rosenau
(74) *Attorney, Agent, or Firm* — Cozen O'Connor

(57) ABSTRACT

A shape memory alloy driver comprises a displacement detection portion, a drive control portion, and a compensation calculation portion. The displacement detection portion detects displacement of a shape memory alloy based on a resistance value etc. detected from the shape memory alloy. The drive control portion applies a voltage or current to the shape memory alloy by servo control to thereby displace the shape memory alloy to a target displacement value fed from a microcomputer etc. The compensation calculation portion calculates a compensated displacement value from the detected displacement value and a variation—attributable to the environment temperature—of the drive control value which the drive control portion uses for controlling the voltage or current. Having been fed with the compensated displacement value, the drive control portion varies the drive control value such that the compensated displacement value is equal to the target displacement value.

8 Claims, 7 Drawing Sheets

SHAPE MEMORY ALLOY DRIVER

RELATED APPLICATIONS

This is a U.S. National Phase of International Application No. PCT/JP2008/071293, filed in the Japanese Patent Office on Nov. 25, 2008, which claims priority on Japanese Patent Application No. 2007-310890, filed Nov. 30, 2007.

TECHNICAL FIELD

The present invention relates to a shape memory alloy driver that drives a movable portion by utilizing shape-restore movement of a shape memory alloy. More particularly, the present invention relates to a shape memory alloy driver that permits compensation for a displacement error of a shape memory alloy caused by variation in environment temperature.

BACKGROUND ART

In image sensing devices such as digital cameras, close studies have been conducted on practical application of a shape memory alloy actuator (i.e., a shape memory alloy driver) that moves a lens by use of a shape memory alloy. The shape memory alloy contracts by being applied with a voltage or current and heated. In addition, the shape memory alloy expands by dissipating heat. Thus, by connecting a movable portion such as a lens unit to one end of the shape memory alloy to apply a voltage or current and controlling the amount of current passing, it is possible to perform focusing etc.

The displacement of the shape memory alloy with respect to a driving current varies with the environment temperature. For example, in a case where the environment temperature is extremely low, a driving current larger than normal is needed in order to overheat the shape memory alloy. Accordingly, even if the target displacement is the same, the driving current of the actuator needs to be varied in accordance with the environment temperature.

In relation to the above inconvenience, Patent Document 1 discloses a control device of a unit injector that permits variable control of the amount of fuel injection by use of a shape memory alloy. The control device detects the temperature of the shape memory alloy by use of a temperature sensor or the resistance value of the shape memory alloy. Then, the control device varies the energization amount and the energization time of the shape memory alloy in accordance with the detected temperature to thereby control the amount of fuel injection. As described above, by detecting the state of an object to be controlled and controlling (i.e., performing servo control) such that the object is in a target state, the energization amount etc. (hereinafter referred to as the "drive control value") is controlled such that it varies in accordance with variation in environment temperature, even if the environment temperature varies.

Patent Document 1: JP-A-2006-189045

DISCLOSURE OF THE INVENTION

Problems to be Solved by the Invention

Inconveniently, however, the control device disclosed in Patent Document 1 has the following disadvantages. In a case where the temperature sensor is used, it is disadvantageous in terms of cost and size reduction. In addition, in a case where the resistance of the shape memory alloy is used, a displacement error occurs when a component of the control device thermally expands due to variation in the environment temperature. The displacement error occurs also when the temperature distribution of the shape memory alloy varies locally due to variation in the environment temperature. The control device disclosed in Patent Document 1 is therefore unsuitable for use where high positional accuracy is required.

In view of the inconveniences discussed above, it is an object of the present invention to provide a shape memory alloy driver—i.e. a shape memory alloy actuator that drives a movable portion by utilizing the shape-restore movement of a shape memory alloy—that compensates, with high accuracy, for displacement errors attributable to variation in environment temperature without using a temperature sensor.

Means for Solving the Problem

To achieve the above object, according to the present invention, a shape memory alloy driver comprises: a displacement detection portion for detecting displacement of a shape memory alloy; and a drive control portion for applying a voltage or current to the shape memory alloy such that a detected displacement value that indicates displacement detected by the displacement detection portion is equal to a target displacement value, and a compensation calculation portion for calculating a compensated displacement value based on the detected displacement value and on a drive control value that indicates an amount of voltage or current applied by the drive control portion, the compensated displacement value having compensated therein a displacement error of the detected displacement value attributable to variation in temperature, and wherein the drive control portion controls the drive control value such that the compensated displacement value is equal to a target displacement value.

With this configuration, the shape memory alloy driver according to the invention comprises the displacement detection portion, the drive control portion, and the compensation calculation portion. The displacement detection portion detects displacement occurring in the shape memory alloy based on a resistance value etc. detected from the shape memory alloy. The drive control portion applies a voltage or current to the shape memory alloy by servo control to thereby displace the shape memory alloy to a target displacement value which is fed from a microcomputer etc. The compensation calculation portion compensates for a displacement error occurring in the shape memory alloy attributable to variation in environment temperature.

The compensation calculation portion calculates a compensated displacement value from the detected displacement value and a variation—attributable to environment temperature—of the drive control value which the drive control portion uses for controlling the voltage or current. Having been fed with the compensated displacement value, the drive control portion performs control whereby the drive control value is varied such that the compensated displacement value is equal to the target displacement value. Compensation calculation by the compensation calculation portion and drive control by the drive control portion are performed repetitively to thereby drive the shape memory alloy.

In the shape memory alloy driver according to the invention, the displacement detection portion detects resistance of the shape memory alloy to thereby acquire a detected resistance value; the compensation calculation portion calculates a compensated resistance value based on the drive control value and on the detected resistance value, the compensated resistance value having corrected therein an error of the detected resistance value attributable to variation in temperature; and the drive control portion controls the drive control value such that the compensated resistance value is equal to a target resistance value that indicates a resistance value of the shape memory alloy corresponding to the target displacement value.

With this configuration, the displacement detection portion comprises a resistance-value detection portion that detects the resistance value of the shape memory alloy. In addition, the compensation calculation portion calculates the compensated resistance value from the detected resistance value and the variation—attributable to environment temperature—of the drive control value which the drive control portion uses. Having been fed with the compensated resistance value, the drive control portion performs control whereby the drive control value is varied such that the compensated resistance value is equal to the target resistance value, i.e., the resistance value corresponding to the target displacement value. With respect to the target resistance value, the drive control portion may calculate it based on the target displacement value, or a control device such as a microcomputer may feed it directly to the drive control portion.

In the shape memory alloy driver according to the invention, the compensation calculation portion calculates the compensated displacement value by use of a displacement detection term, in which the detected displacement value is subjected to calculation using a constant or function, and a temperature compensation term, in which the drive control value is subjected to calculation using a constant or function, and the compensation calculation portion sets the constant or function such that the temperature compensation term has a comparatively small value than the displacement detection term.

With this configuration, the compensation calculation portion calculates the displacement detection term by subjecting the detected displacement value to calculation using a constant or function. In addition, the compensation calculation portion calculates the temperature compensation term by subjecting the drive control value to calculation using a constant or function. Then, by adding up the displacement detection term and the temperature compensation term, the compensation calculation portion calculates the compensated displacement value. Here, a constant or function that allows the temperature compensation term to be comparatively smaller than the displacement detection term is used. In this way, such a calculation formula is achieved that, while control is performed based on the detected displacement basically, a comparatively small displacement error due to variation in temperature is compensated.

The shape memory alloy driver according to the invention comprises a filter portion for restricting the upper limit of a control frequency range of an output signal of the drive control portion fed from the drive control portion to the compensation calculation portion.

With this configuration, the shape memory alloy driver comprises the filter portion such as a low-pass filter. Being provided between a drive-control calculation portion and a temperature-compensation calculation portion, the filter portion let only a low-range component, of a control frequency range of an output signal of the drive-control calculation portion, pass through and feeds the component to the temperature-compensation calculation portion. This eliminates high frequency noise, an extreme variation in the drive control value, etc., and stabilizes the drive control value.

Moreover, the shape memory alloy driver according to the invention comprises a hold portion for making the drive control value, which is fed from the drive control portion to the compensation calculation portion, a fixed value.

With this configuration, the shape memory alloy driver comprises the hold portion such as a hold circuit. Being provided between the drive-control calculation portion and the temperature-compensation calculation portion, the hold portion temporarily makes the drive control value, which is outputted from the drive-control calculation portion, a fixed value and feeds it to the temperature-compensation calculation portion. For example, on being fed with a hold signal from a microcomputer or the like, the hold portion acquires the drive control value at that time and feeds the acquired value to the temperature-compensation calculation portion as a fixed value. Thus, even if the drive control value varies extremely during a transient response, over-response of the temperature-compensation calculation portion is prevented and the response is stabilized.

In the shape memory alloy driver according to the invention, the compensation calculation portion performs compensation calculation of the displacement error by use of a hysteresis correction value that is calculated based on a control history of the drive control portion.

With this configuration, a control device such as a microcomputer feeds the hysteresis correction value to the temperature-compensation calculation portion. The shape memory alloy is provided with a characteristic such that, even at the same environment temperature, the drive control value that corresponds to the displacement differs depending on a heating process/a cooling process. The hysteresis correction value is a correction value for correcting this characteristic. Specifically, the control device calculates the hysteresis correction value from characteristics of the shape memory alloy and a drive history of the shape memory alloy driver. The temperature-compensation calculation portion adds the hysteresis correction value to the result of normal compensation calculation and thereby performs calculation of the compensated displacement value, the compensated resistance value, and the like.

Moreover, according to the invention, a shape memory alloy driver comprises: a displacement detection portion for detecting displacement of a shape memory alloy; and a drive control portion for applying a voltage or current to the shape memory alloy such that a detected displacement value that indicates displacement detected by the displacement detection portion is equal to a target displacement value, and a compensation calculation portion for calculating a compensated target displacement value based on a target displacement value and on the drive control value, the compensated target displacement value having compensated therein a displacement error of the target displacement value attributable to variation in temperature, and the drive control portion controls the drive control value such that the detected displacement value is equal to the compensated target displacement value.

With this configuration, the compensation calculation portion calculates the compensated target displacement value from the target displacement value fed from a microcomputer or the like and variation—attributable to environment temperature—of the drive control value which the drive control portion uses. Having been fed with the compensated target displacement value, the drive control portion performs control whereby the drive control value is varied such that the detected displacement value is equal to the compensated target displacement value.

Advantages of the Invention

In a shape memory alloy driver according to the present invention, a compensation calculation portion calculates a compensated displacement value from a detected displacement value and a drive control value, and a drive control value is controlled such that the compensated displacement value is equal to a target displacement value. This helps perform drive control of a movable portion—for example, a lens unit or the like—connected to a shape memory alloy while the influence of temperature variation is kept to a minimum. Moreover, since compensation of displacement errors is performed by utilizing variation in the drive control value caused by environment temperature, it is possible to cope with variation in environment temperature by control processing alone, i.e., without adding a new member such as a temperature sensor. This realizes a reduced size and a lower cost of the driver, and realizes displacement control with high accuracy.

Moreover, according to the invention, a compensated resistance value is calculated based on variation in the drive control value in accordance with variation in temperature, and the drive control value is controlled such that the compensated resistance value is equal to a target resistance value. Since temperature compensation is performed by use of an existing resistance-value detection portion in this way, displacement control is performed at a lower cost and yet with high accuracy.

Moreover, according to the invention, a temperature compensation term uses such constant or function that makes it comparatively smaller than a displacement detection term. This prevents the temperature compensation term from being dominant in a temperature compensation calculation, and accordingly prevents an increase in the converging time required for the compensated displacement value, the compensated resistance value, or the like to converge.

Moreover, according to the invention, with the provision of a filter portion, only a low-range component of the drive control value is fed to a temperature-compensation calculation portion. This eliminates high frequency noise, extreme variation in the drive control value, etc. Accordingly, in a system where the responsivity is enhanced by servo control etc., even if a driving voltage becomes very large during a transient response, it is possible to prevent over-response of the temperature compensation term and to stabilize the response. Thus, an increase in the converging time required for the compensated displacement value, the compensated resistance value, or the like to converge is prevented.

Moreover, according to the invention, on being fed with a hold signal, a hold portion acquires the drive control value at that time, and feeds the acquired value to the temperature-compensation calculation portion as a fixed value. Accordingly, in a system where the responsivity is enhanced by servo control etc., even if a driving current becomes very large during a transient response, it is possible to prevent over-response of the temperature compensation term and to stabilize the response. Thus, an increase in the converging time required for the compensated displacement value, the compensated resistance value, or the like to converge is prevented.

Moreover, according to the invention, a control device such as a microcomputer feeds a hysteresis correction value to the temperature-compensation calculation portion. The temperature-compensation calculation portion adds the hysteresis correction value to the result of normal compensation calculation and thereby performs calculation of the compensated displacement value, the compensated resistance value, and the like. Introducing the hysteresis correction value in this way makes it possible to perform displacement control with higher accuracy as compared with a case in which only the variation in the drive control value due to environment temperature alone is used.

Moreover, according to the invention, the compensated target displacement value is calculated based on variation in the drive control value in accordance with variation in temperature, and the drive control value is controlled such that the detected displacement value is equal to the compensated target displacement value. As described above, the present invention is carried out by simply varying the target displacement value fed from a microcomputer or the like, and thus displacement control is performed at a lower cost and yet with high accuracy.

LIST OF REFERENCE SYMBOLS 100 shape memory alloy actuator (shape memory alloy driver)
1 shape memory alloy
10a drive-control calculation portion (drive control portion)
10b temperature-compensation calculation portion (compensation calculation portion)
12 resistance-value detection portion (displacement detection portion)
13 drive-control calculation portion (drive control portion)
14 temperature-compensation calculation portion (compensation calculation portion)
15 LPF (filter portion)
16 hold circuit (hold portion)

BEST MODE FOR CARRYING OUT THE INVENTION

Hereinafter, embodiments of the present invention will be described with reference to the relevant drawings. It should be understood that the embodiments described below are merely examples, and are therefore not meant to limit in any way the manner in which the present invention can be carried out.

First Embodiment

Figure 1:
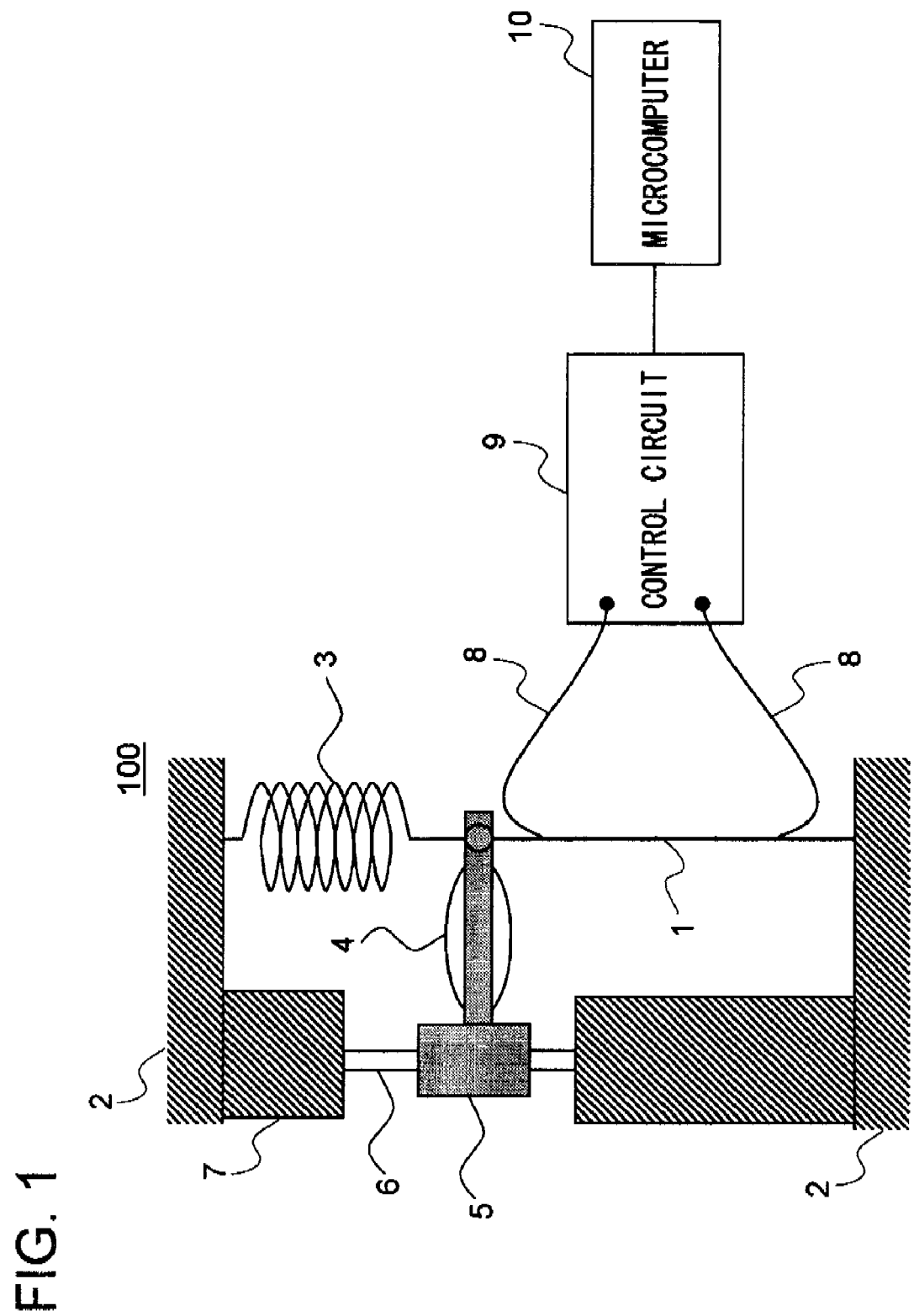
FIG. 1 is a configuration diagram showing a shape memory alloy driver according to the present invention.

<1-1. Internal Configuration>
FIG. 1 is a configuration diagram showing a shape memory alloy actuator 100 (i.e., a shape memory alloy driver) according to a first embodiment of the present invention. The shape memory alloy actuator 100 is provided with a shape memory alloy 1, a fixing portion 2, a bias spring 3, a lens 4, a movable portion 5, a guide axis 6, a stopper 7, conductors 8, and a control circuit 9. In addition, as an external device connected to the control circuit 9, there is a microcomputer 10.

The shape memory alloy 1 having a shape of a linear member has one end thereof fitted to the fixing portion 2 and the other end thereof fitted to the movable portion 5. The bias spring 3 has one end thereof fitted to the fixing portion 2 and the other end thereof fitted to the movable portion 5 on a side opposite from the shape memory alloy 1. The bias spring 3 therefore applies stress in a direction in which the movable portion 5 and the shape memory alloy 1 are pulled.

The movable portion 5 is fitted with the lens 4, and a movable axis of the movable portion 5 is determined by the guide axis 6. The stopper 7 restricts the movable range of the movable portion 5 when the shape memory alloy 1 contracts due to being heated. In the above configuration, when the shape memory alloy 1 contracts or hardens due to being heated, the bias spring 3 stretches. On the other hand, when the shape memory alloy 1 softens due to dissipating heat, it stretches owing to the stress of the bias spring 3. In this way, the movable portion 5 with the lens 4 placed therein moves.

Opposite ends of the shape memory alloy 1 are connected to the control circuit 9 with the conductors 8, permitting application of a voltage or current. By use of a resistance-value detection portion 12 (FIG. 2) which will be described later, the control circuit 9 detects a resistance value of the shape memory alloy 1 and, based on the detected resistance value, calculates displacement occurring in the shape memory alloy 1. The correlation between the displacement and the resistance value has been previously studied, and is held in a recording portion (unillustrated), inside the control circuit 9, or the like.

The microcomputer 10 feeds to the control circuit 9 a target resistance value which indicates the resistance value corresponding to the displacement required for moving the movable portion 5 to a target position. The control circuit 9 performs servo control whereby the amount of current passing (i.e., the drive control value) is varied, so that the fed target resistance value is achieved. Specifically, until the resistance value detected by the resistance-value detection portion 12 is equal to the target resistance value, increasing/decreasing of the drive control value and detection of the resistance value are repeated. This helps perform drive control such that the movable portion 5 moves to the target position.

With the above configuration, displacement control is possible without using a position sensor; however, it is impossible to detect variation in displacement attributable to a member such as the fixing portion 2 thermally expanding. Thus, in a case where environment temperature varies, a displacement error may occur.

The relationship between a displacement value D, which indicates the displacement occurring in the shape memory alloy 1, and a detected resistance value X detected by the resistance-value detection portion 12, which will be described later, changes in accordance with variation in environment temperature. It is assumed that the downward direction in FIG. 1 be the direction in which the displacement of the movable portion 5 becomes large, and a contact position with the stopper 7 be the origin of displacement. In a case where the environment temperature has become high, the fixing portion 2 thermally expands in the up/down directions. Then, the movable portion 5 starts to move from the origin of displacement in a state where the shape memory alloy 1 is elongated than normal.

That is, the movable portion 5 starts to move from a state where the detected resistance value X is larger than normal.

As a result, the characteristic curve (unillustrated) that indicates the relationship between the displacement value D and the detected resistance value X shifts in a direction in which the detected resistance value X is large. On the other hand, in a case where the environment temperature is low, an opposite phenomenon is observed; specifically the movable portion 5 starts to move from a state where the detected resistance value X is smaller than normal. As a result, the characteristic curve shifts in a direction in which the detected resistance value X is small.

For example, suppose the target displacement value fed from the microcomputer 10 is $D_1$, and the environmental temperature is low. Conventionally, a drive control value Y (i.e., a driving current or driving voltage) has been determined with a resistance value $X_1$, which corresponds to a displacement value $D_1$ when the temperature is normal, used as a target resistance value Z. However, when the temperature is low, the resistance value corresponding to the displacement value $D_1$ is not $X_1$. Thus, unless some sort of compensation is performed, a displacement error occurs. A displacement error as just mentioned is problematic in application where a positional accuracy of the lens 4 is required.

Next, the relationship between the displacement of the shape memory alloy 1 and the drive control value Y will be described based on the temperature variation characteristic. The shape memory alloy actuator 100 operates in accordance with the temperature of the shape memory alloy 1. Accordingly, when the environment temperature varies, it is necessary to vary the amount of Joule heat generated in order to make the shape memory alloy 1 have a target temperature.

In a case where the environment temperature is low, a large amount of Joule heat is needed, and thus the drive control value Y needs to be increased than when the temperature is normal. In a case where the environment temperature is high, by contrast, the drive control value Y needs to be reduced than when the temperature is normal. As in this embodiment, in a configuration where control is performed with a detected resistance value X used as a target value, the drive control value Y increases/decreases in accordance with the environment temperature as a result. Accordingly, based on the known characteristic of this configuration, namely variation in the drive control value Y that increases/decreases in accordance with the environment temperature, an error of the detected resistance value X attributable to variation in temperature is compensated.

<1-2. Control Circuit Configuration>

Figure 2:
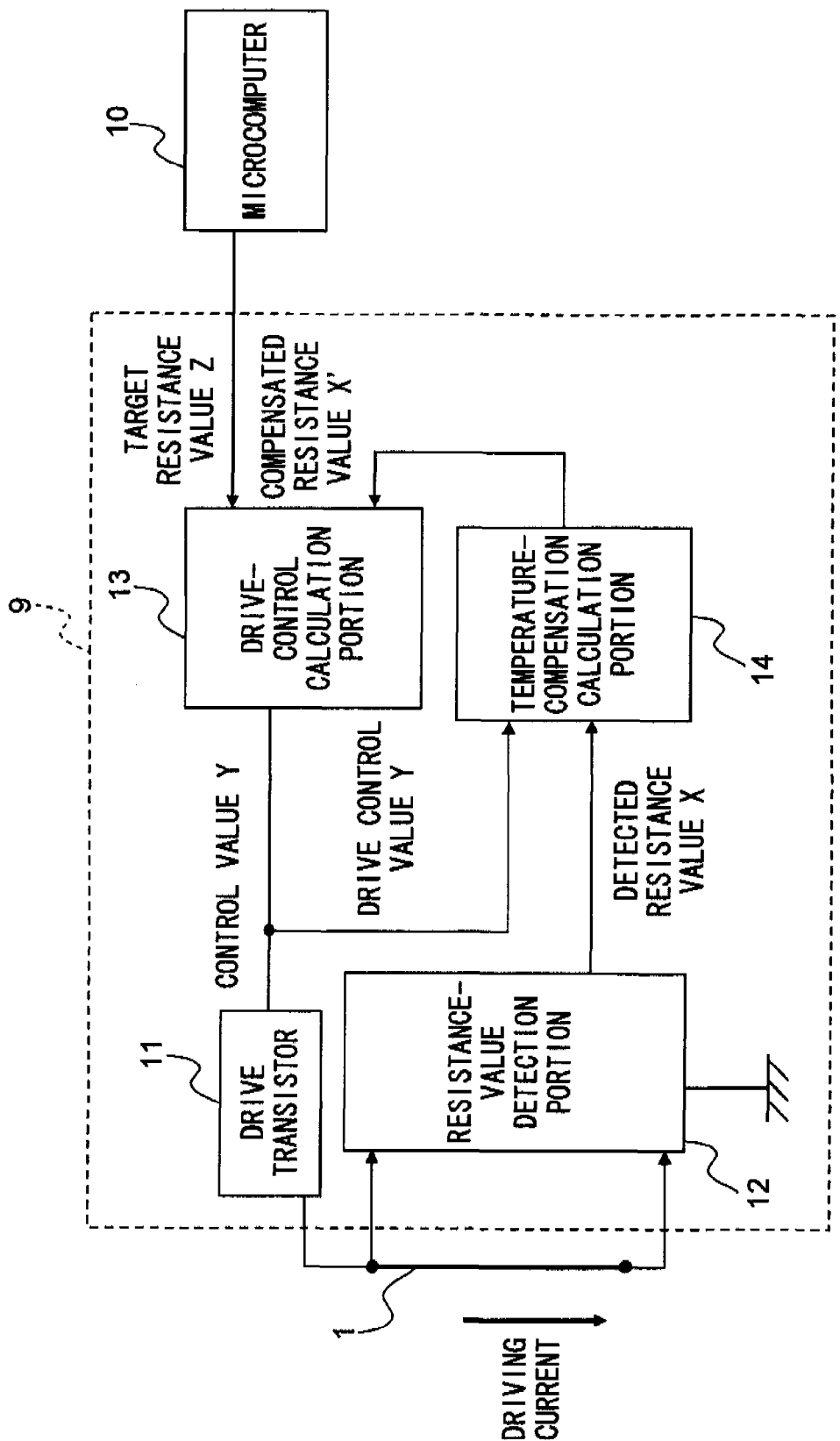
FIG. 2 is a block diagram showing a configuration of a control circuit according to a first embodiment of the invention.

FIG. 2 is a block diagram showing the details of the control circuit 9 according to the first embodiment of the present invention. The control circuit 9 is provided with a drive transistor 11, a resistance-value detection portion 12 (i.e., a displacement detection portion), a drive-control calculation portion 13 (i.e., a drive control portion), and a temperature-compensation calculation portion 14 (i.e., a compensation calculation portion). In addition, the drive-control calculation portion 13 is connected to a microcomputer 10, from which a target resistance value Z is fed.

A shape memory alloy 1 is connected to the drive-control calculation portion 13 via the drive transistor 11. The drive transistor 11 controls the amount of energization according to a drive control value Y fed from the drive-control calculation portion 13. Opposite terminals of the shape memory alloy 1 are connected to the resistance-value detection portion 12. The resistance-value detection portion 12 detects the resistance of the shape memory alloy 1 and feeds a detected resistance value X to the temperature-compensation calculation portion 14. Alternatively, the resistance-value detection portion 12 may be provided with a function for calculating a detected displacement value D from the detected resistance value and feeding it to the temperature-compensation calculation portion 14.

The drive-control calculation portion 13 performs control of the drive control value Y such that the target resistance value Z fed from the microcomputer 10 is equal to the detected resistance value X of the shape memory alloy 1. Alternatively, control may be performed such that a target displacement value E fed from the microcomputer 10 is equal to the detected displacement value D of the shape memory alloy 1. The drive-control calculation portion 13 also has a function for feeding the value of the current drive control value Y to the temperature-compensation calculation portion 14.

The temperature-compensation calculation portion 14 calculates, from the drive control value Y and the detected resistance value X, a compensated resistance value X' that has been subjected to temperature compensation. Specifically, for example, by use of the following formula, X' is calculated from X and Y. X'=α×X+β×Y (α and β are constants, or are functions of X and Y) Note that α×X is a resistance-value detection term, and β×Y is a temperature compensation term. For α and β, constants such as "9" and "0.05" are used, for example, in a case in a most simple embodiment. X'=X holds when α=1 and β=0; thus, this results in a state without temperature compensation, as in the conventional art.

Characteristics of the detected resistance value X and the drive control value Y, of which both vary in accordance with variation in temperature, may be studied previously, and X' may be calculated by use of functions α and β that are derived from those characteristics. In this case, the function α and the function β have, for example, the detected resistance value X, the drive control value Y, the environment temperature fed from the microcomputer 10, or the like, as parameters. The compensated resistance value X' so calculated is fed to the drive-control calculation portion 13 to be used for comparison with the target resistance value Z.

In the drive-control calculation portion 13, Y is calculated with X' as a variable, and Y is fed back within the control circuit 9. Thus, so that displacement control may be stable in the control circuit 9 according to this embodiment, the resistance-value detection term needs to be dominant, that is, the formula |α×X|>>|β×Y| needs to hold. Accordingly, if the temperature compensation term is sufficiently smaller than the resistance-value detection term, stable control is possible.

In practice, the displacement error due to variation in temperature has a significantly small value compared with the detected resistance value X. Accordingly, setting is performed such that the value of constant/function β is significantly small compared with the value of constant/function α. As a result, the temperature compensation term is about one several-tenths of the resistance-value detection term. Thus, the above relation is not reversed, and no such problems occur as it takes time for the value of X' to stabilize.

Embodiment 2

<2-1. Internal Configuration>
Contents are similar to those in FIG. 1 of the first embodiment, and thus no description of them will be repeated.

Figure 3:
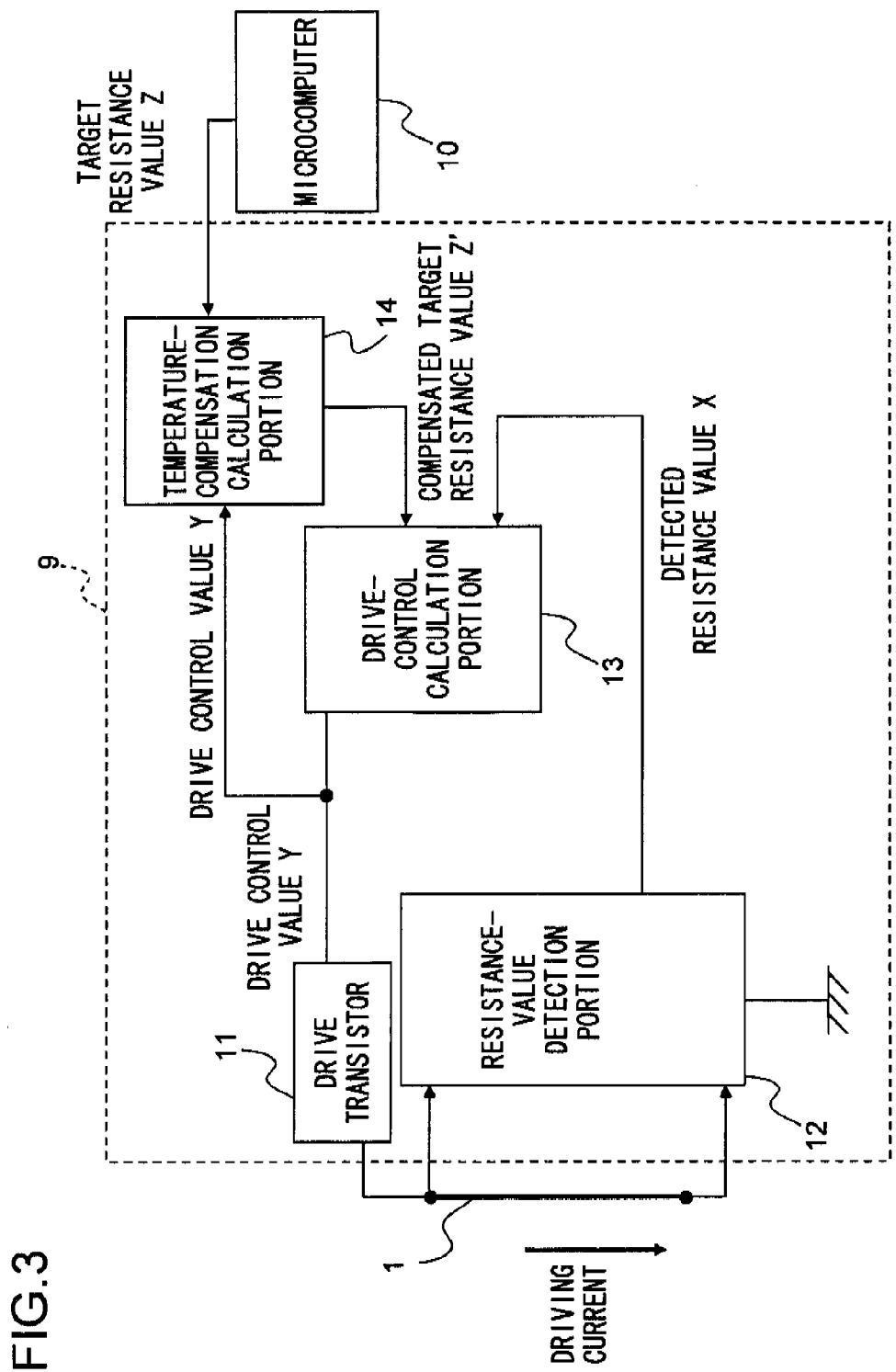
FIG. 3 is a block diagram showing a configuration of a control circuit according to a second embodiment of the invention.

<2-2. Control Circuit Configuration>
Here, the details of a control circuit 9 according to a second embodiment of the present invention will be described with reference to a block diagram of FIG. 3. Such components as find their counterparts in the first embodiment are identified by common reference signs, and no description of them will be repeated.

The control circuit 9 according to this embodiment has a similar configuration to the drive transistor 11 to the temperature-compensation calculation portion 14 according to the first embodiment; however, functions of individual functional blocks are partly different from those in the first embodiment. A temperature-compensation calculation portion 14 according to this embodiment is not fed with a detected resistance value X but is fed with a target resistance value Z, and outputs a compensated target resistance value Z'. Accordingly, the drive-control calculation portion 13 compares the detected resistance value X with the compensated target resistance value Z' and thereby performs control of a drive control value Y.

A drive-control calculation portion 13 according to this embodiment performs control of the drive control value Y such that the compensated target resistance value Z' fed from the temperature-compensation calculation portion 14 is equal to the detected resistance value X fed from the resistance-value detection portion 12. In addition, the drive-control calculation portion 13 has a function for feeding the value of the current drive control value Y to the temperature-compensation calculation portion 14.

The temperature-compensation calculation portion 14 calculates Z' from Z and Y, as in the following formula.

$$Z'=α×Z+β×Y \text{ (α and β are constants, or are functions of Z and Y)}$$

Note that α×Z is a target resistance-value term, and β×Y is a temperature compensation term. A method used for deriving α and β is similar to that used in the first embodiment, and thus no description of it will be repeated.

Third Embodiment

<3-1. Internal Configuration>
Contents are similar to those in FIG. 1 of the first embodiment, and thus no description of them will be repeated.

Figure 4:
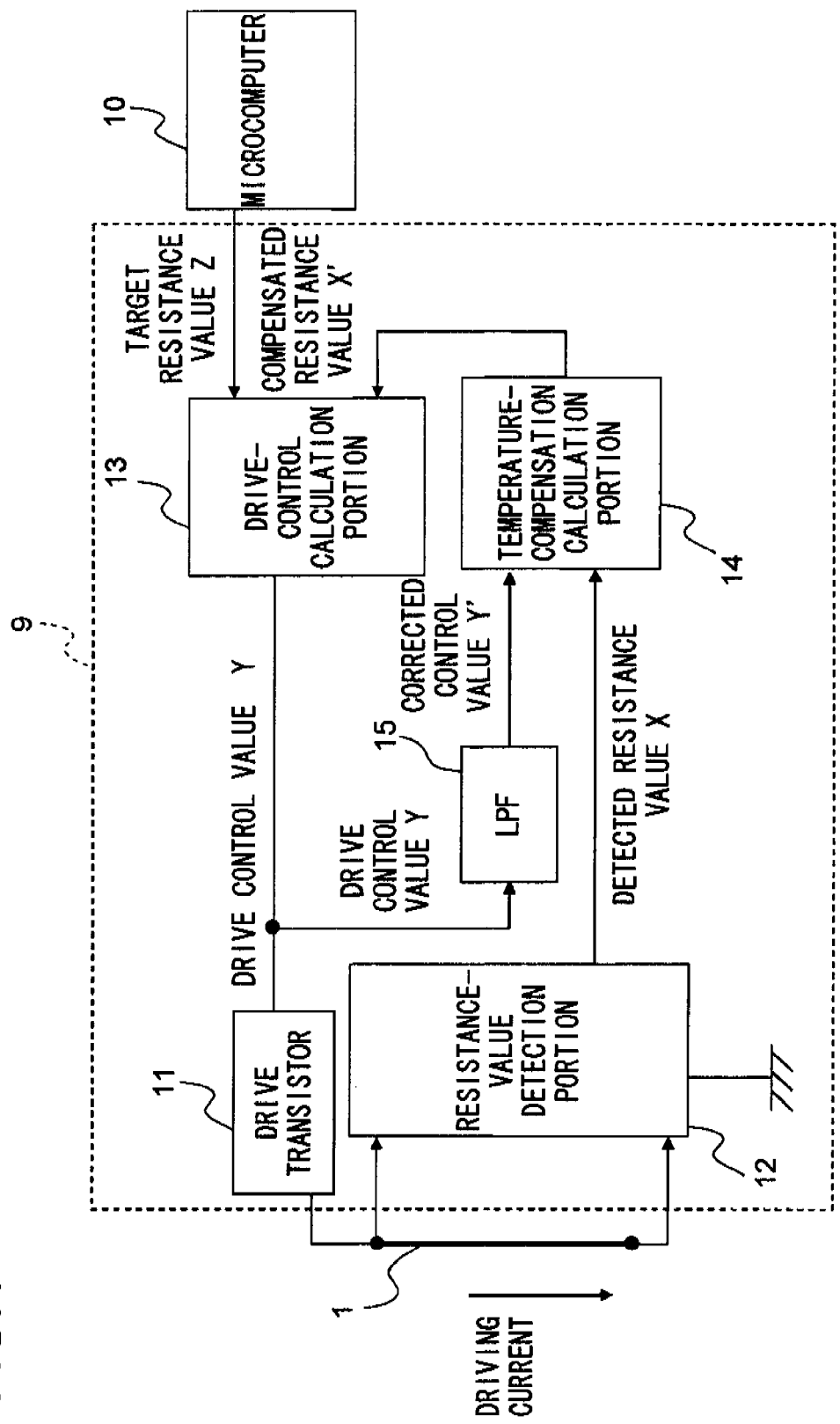
FIG. 4 is a block diagram showing a configuration of a control circuit according to a third embodiment of the invention.

<3-2. Control Circuit Configuration>
Here, the details of a control circuit 9 according to a third embodiment of the present invention will be described with reference to a block diagram of FIG. 4. Such components as find their counterparts in the first embodiment are identified by common reference signs, and no description of them will be repeated.

The control circuit 9 according to this embodiment is provided with, in addition to the drive transistor 11 to the temperature-compensation calculation portion 14 according to the first embodiment, an LPF (low-pass filter) 15 (i.e., a filter portion). Functions of individual functional blocks are partly different from those in the first embodiment. Within a signal fed from the drive-control calculation portion 13, the LPF 15 let only a low frequency component pass through it. In this way, a corrected control value Y' having extracted therein a low frequency component of a drive control value Y is fed to the temperature-compensation calculation portion 14.

A drive-control calculation portion 13 according to this embodiment feeds the value of the current drive control value Y to the LPF 15. The temperature-compensation calculation portion 14 calculates a compensated resistance value X' that has been subjected to temperature compensation, from the corrected control value Y' fed from the LPF 15 and a detected resistance value X.

The temperature-compensation calculation portion 14 calculates X' from X and Y' as in the following formula.

$$X'=α×X+β×Y' \text{ (α and β are constants, or are functions of X and Y')}$$

Note that α×X is a resistance-value detection term, and β×Y' is a temperature compensation term. A method used for deriving α and β is similar to that used in the first embodiment, and thus no description of it will be repeated.

With the above configuration, the frequency range is restricted by the LPF 15 and thereby the response of the temperature compensation term is delayed relatively. This prevents the temperature compensation term from responding, and hence nullifies it, when the drive control value Y varies sharply. Accordingly, in a system where the responsivity is enhanced by servo control etc., even if the driving current becomes very large during a transient response, it is possible to prevent over-response of the temperature compensation term and to stabilize the response. This prevents an increase in the converging time required for the value of the compensated resistance value X' to converge.

The purpose of the temperature compensation term is to compensate for variation in environment temperature, which is a slow variation. Thus, even if a response is slightly delayed by the LPF 15, the influence is small. Accordingly, even if the responsivity is lowered as in this embodiment, temperature compensation is performed without a problem.

Fourth Embodiment

<4-1. Internal Configuration>

Contents are similar to those in FIG. 1 of the first embodiment, and thus no description of them will be repeated.

<4-2. Control Circuit Configuration>

Figure 5:
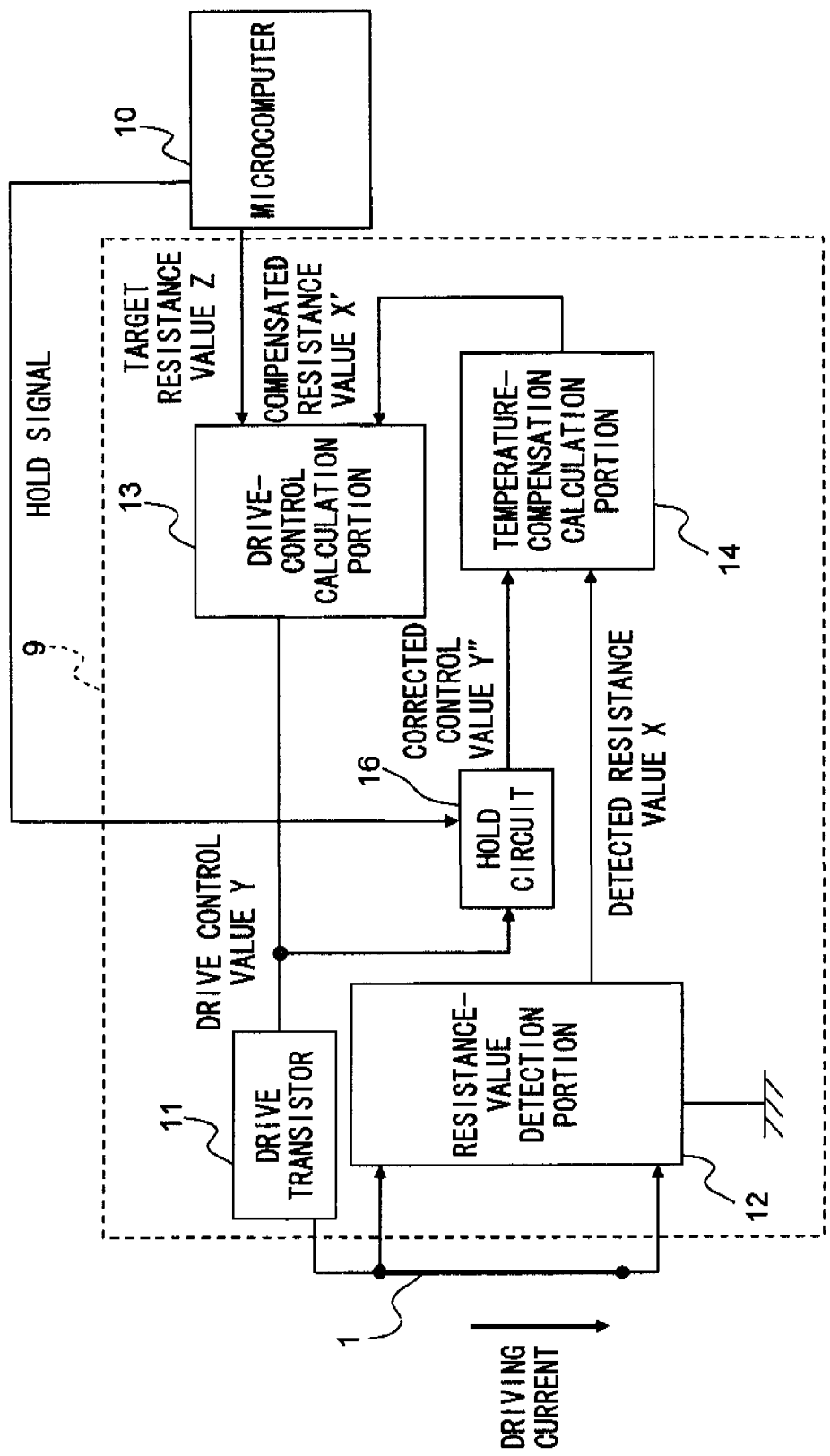
FIG. 5 is a block diagram showing a configuration of a control circuit according to a fourth embodiment of the invention.

Here, the details of a control circuit 9 according to a fourth embodiment of the present invention will be described with reference to a block diagram of FIG. 5. Such components as find their counterparts in the first embodiment are identified by common reference signs, and no description of them will be repeated.

The control circuit 9 according to this embodiment is provided with, in addition to the drive transistor 11 to the temperature-compensation calculation portion 14 according to the first embodiment, a hold circuit 16 (i.e., a hold portion). During a period in which a hold signal is negated by a microcomputer 10, the hold circuit 16 feeds a drive control value Y—which is fed from the drive-control calculation portion 13—, as is, to the temperature-compensation calculation portion 14, as the corrected control value Y'''.

When the hold signal is asserted by the microcomputer 10, the hold circuit 16 holds Y at the time of the assertion. Until the hold signal is negated, the hold circuit 16 feeds the value so held to the temperature-compensation calculation portion 14, as the corrected control value Y'''. That is, during the assertion, the drive control value Y fed from the drive-control calculation portion 13 is abandoned, and hence is not transmitted to the temperature-compensation calculation portion 14. Assertion of the hold signal is performed during a period of a transient response or the like when the target resistance value is varied, for example, along with variation in the target displacement of a shape memory alloy 1.

The temperature-compensation calculation portion 14 calculates X' from X and Y''', as in the following formula.

$$X'=\alpha \times X+\beta \times Y''' \text{ (α and β are constants, or are functions of } X \text{ and } Y''')$$

Note that α×X is a resistance-value detection term, and β×Y''' is a temperature compensation term. A method used for deriving α and β is similar to that used in the first embodiment, and thus no description of it will be repeated.

Fixing Y''' by the hold circuit 16 prevents variation in the temperature compensation term during a transient response and stabilizes displacement control. Accordingly, in a system where the responsivity is enhanced by servo control etc., even if a driving current becomes very large during a transient response, it is possible to prevent over-response of the temperature compensation term and to stabilize the response, as in the third embodiment. In addition, an increase in converging time of the compensated resistance value X' is prevented.

Fifth Embodiment

<5-1. Internal Configuration>

Contents are similar to those in FIG. 1 of the first embodiment, and thus no further description of them will be repeated.

<5-2. Control Circuit Configuration>

Figure 6:
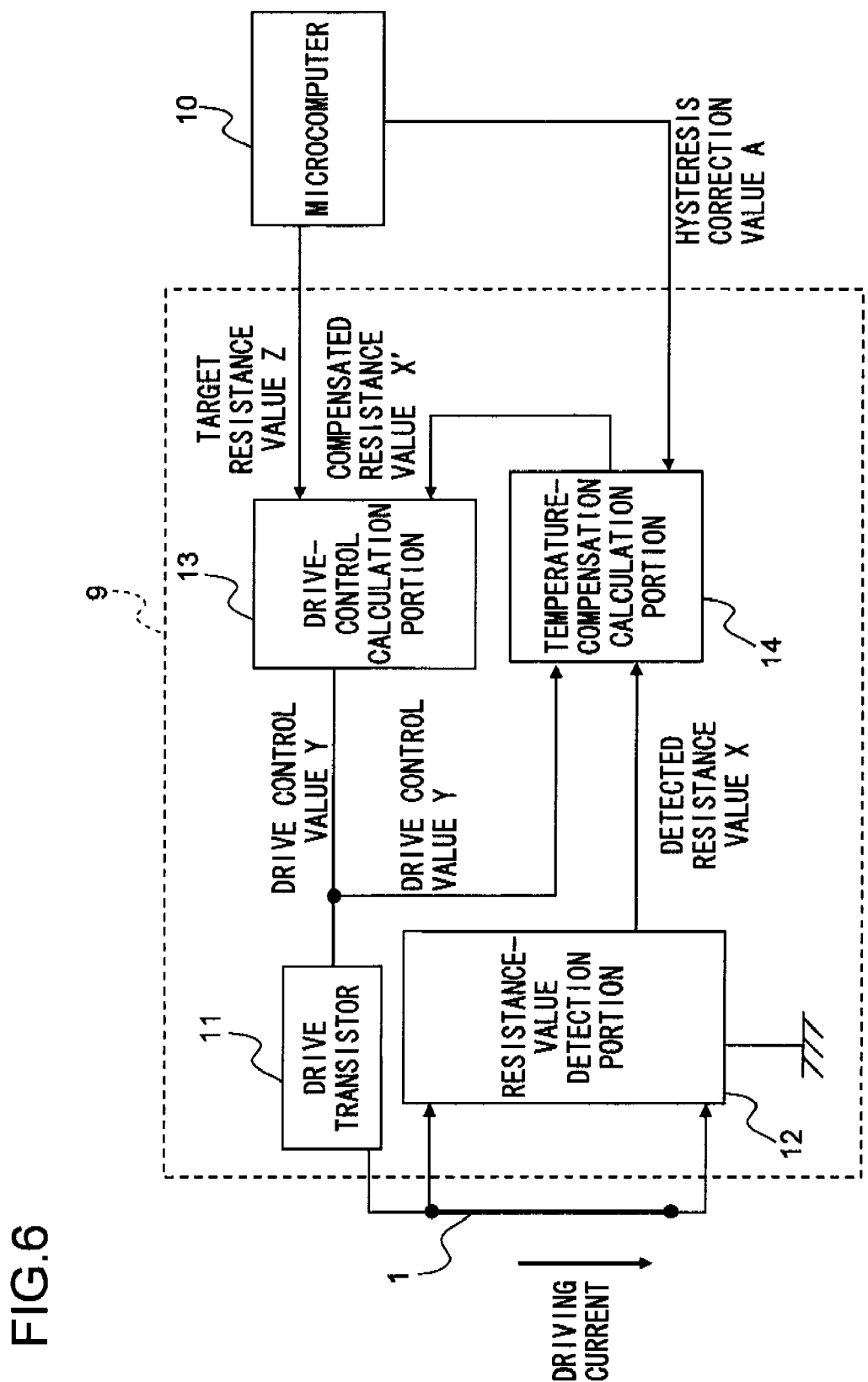
FIG. 6 is a block diagram showing a configuration of a control circuit according to a fifth embodiment of the invention.

Here, the details of a control circuit 9 according to a fifth embodiment of the present invention will be described with reference to a block diagram of FIG. 6. Such components as find their counterparts in the first embodiment are identified by common reference signs, and no description of them will be repeated.

The control circuit 9 according to this embodiment has a similar configuration to that of the drive transistor 11 to the temperature-compensation calculation portion 14 of the first embodiment; however, the function of the temperature-compensation calculation portion 14 is partly different. A temperature-compensation calculation portion 14 according to this embodiment performs compensation for a detected resistance value X based on a hysteresis correction value A fed from a microcomputer 10.

The temperature-compensation calculation portion 14 calculates X' from X, Y, and A, as in the following formula.

$$X'=\alpha \times X+\beta \times Y+A \text{ (α and β are constants, or are functions of } X \text{ and } Y)$$

Note that α×X is a resistance-value detection term, β×Y is a temperature compensation term, and A is a hysteresis correction term. The shape memory alloy 1 is provided with a characteristic (i.e., a hysteresis characteristic) such that, even in the same environment temperature, the drive control value Y that corresponds to the displacement value D differs depending on a heating process/a cooling process. A is a correction term introduced for correcting this characteristic. A method used for deriving α and β is similar to that used in the first embodiment, and thus no description of it will be repeated.

Specifically, the microcomputer 10 determines the correction value A from a drive history of the movable portion 5 and characteristic data of the shape memory alloy 1 that has been acquired by a previous study. The microcomputer 10 holds a control history of the shape memory alloy actuator 100, and thus, from the control history, it judges which state of the heating process/the cooling process the shape memory alloy 1 is in, and corrects the detected resistance value X.

It is desirable that the hysteresis correction value A be kept being fed to the temperature-compensation calculation portion 14 always, so long as control of the shape memory alloy actuator 100 is performed. Introducing the above correction makes it possible to perform displacement control with higher accuracy than normal.

Sixth Embodiment

<6-1. Internal Configuration>

Contents are similar to those in FIG. 1 of the first embodiment, and thus no further description of them will be repeated.

<6-2. Control Circuit Configuration>

Figure 7:
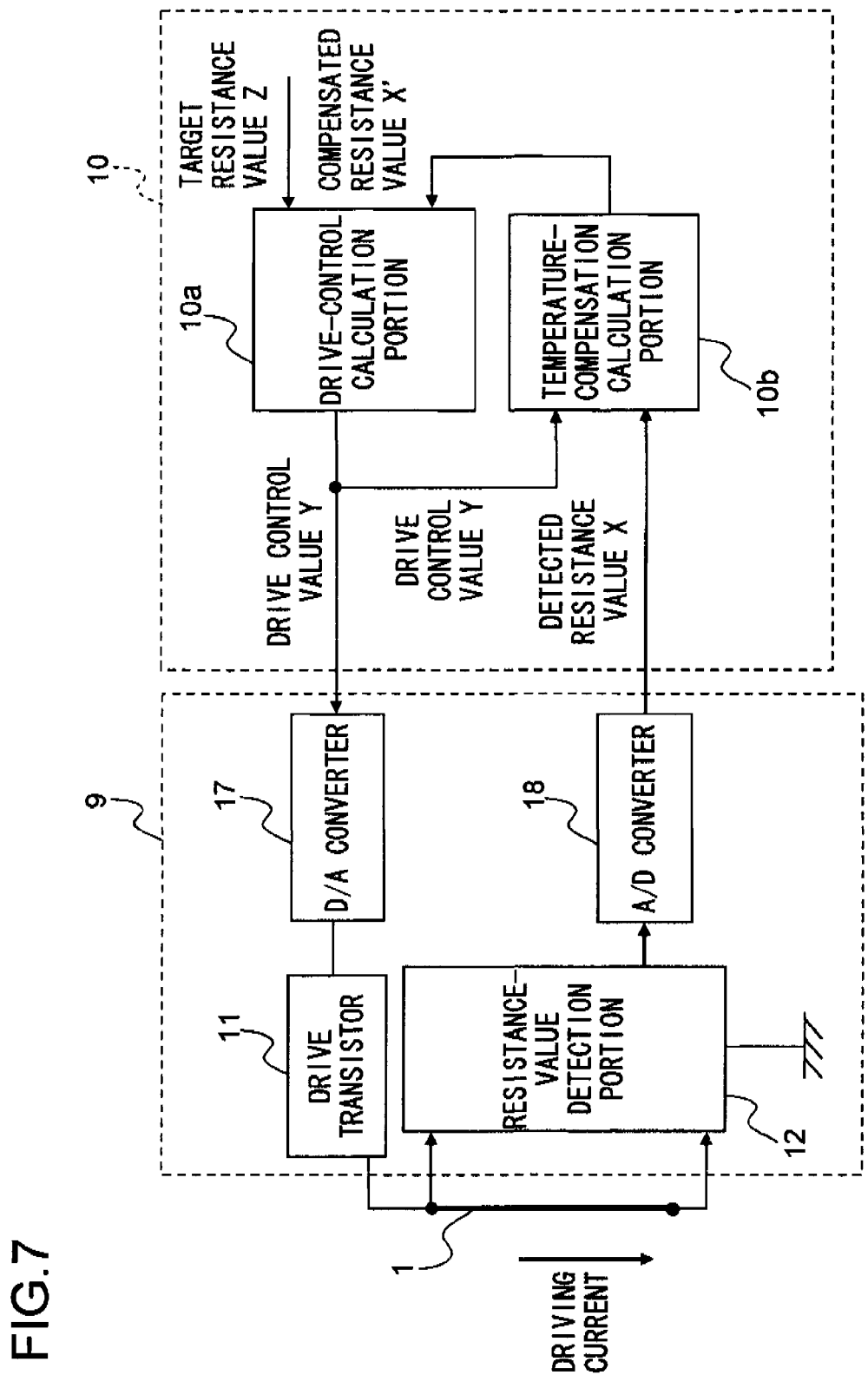
FIG. 7 is a block diagram showing a configuration of a control circuit according to a sixth embodiment of the invention.

Here, the details of a control circuit 9 according to a sixth embodiment of the present invention will be described with reference to a block diagram of FIG. 7. Such components as find their counterparts in the first embodiment are identified by common reference signs, and no description of them will be repeated.

The control circuit 9 according to this embodiment is provided with, in addition to the drive transistor 11 and the resistance-value detection portion 12 according to the first embodiment, a D/A converter 17 and an A/D converter 18. The control circuit 9 is also provided with, instead of the drive-control calculation portion 13 and the temperature-compensation calculation portion 14, a drive-control calculation portion 10a and a temperature-compensation calculation portion 10b that are realized by performing predetermined programs in a microcomputer 10.

A drive control value Y calculated by the drive-control calculation portion 10a of the microcomputer 10 is fed via the D/A converter 17 to the drive transistor 11. The output value of the resistance-value detection portion 12 is fed via the A/D converter 18 to the temperature-compensation calculation portion 10b, as a detected resistance value X. The detected resistance value X is subjected to temperature compensation calculation performed by the temperature-compensation calculation portion 10b based on the drive control value Y.

Although the above processing operation is identical to that of the drive circuit according to the first embodiment, no additional circuit for calculation is needed, since different calculation portions are processed on a software basis within the microcomputer 10. Moreover, if software of the microcomputer 10 is changed with the same circuit configuration as this, it is possible to replace the drive circuits from the second to the fifth embodiments for microcomputer calculation. Furthermore, it is easy to implement with calculation functions from the different drive circuits combined together, and thus highly-functional temperature compensation is realized at a lower cost.

Other Embodiments

It is to be understood that the present invention may be carried out in any other manner than specifically described above as embodiments, and many modifications and variations are possible within the scope of the technological idea of the present invention.

For example, in the embodiments, the drive-control calculation portion 13 compares the compensated resistance value X' calculated based on the detected resistance value X and on the drive control value Y with the target resistance value Z to control the drive control value Y; however, the drive-control calculation portion 13 may compare a compensated displacement value D', which is calculated based on a detected displacement value D and on a drive control value Y, with a target displacement value E to control the drive control value Y. In this case, a method for calculating the compensated displacement value D' is given by the following formula.

$$D' = \alpha \times D + \beta \times Y \text{ ($\alpha$ and $\beta$ are constants, or are functions of } D \text{ and } Y)$$

The temperature-compensation calculation portion 14 performs compensation calculation according to the above formula based on the detected displacement value D fed from the resistance-value detection portion 12 and on the drive control value Y fed from the drive-control calculation portion 13, and feeds the compensated displacement value D' so calculated to the drive-control calculation portion 13. The target displacement value E is fed to the drive-control calculation portion 13 by the microcomputer 10. A method used for deriving $\alpha$ and $\beta$ is similar to that used in the first embodiment, and thus no description of it will be repeated.

In the embodiments, in order to obtain various compensation values (for example, the compensated resistance value X'), calculation is performed using predetermined formulas; however, various compensation values may be obtained without using the formulas. For example, a table for calculating various compensation values may be previously created and recorded to a recording medium (unillustrated) and, based on the values of various variables (for example, the detected resistance value X and the drive control value Y), various compensation values may be obtained from the table.

The invention claimed is:

1. A shape memory alloy driver comprising:
   a displacement detection portion for detecting displacement of a shape memory alloy; and
   a drive control portion for applying a voltage or current to the shape memory alloy such that a detected displacement value that indicates displacement detected by the displacement detection portion is equal to a target displacement value, and
   a compensation calculation portion for calculating a compensated displacement value based on the detected displacement value and on a drive control value that indicates an amount of voltage or current applied by the drive control portion, the compensated displacement value compensating for a displacement error of the detected displacement value due to variation in temperature,
   wherein the drive control portion controls the drive control value such that the compensated displacement value is equal to a target displacement value,
   wherein the displacement detection portion detects resistance of the shape memory alloy to thereby acquire a detected resistance value,
   wherein the compensation calculation portion calculates a compensated resistance value based on the drive control value and on the detected resistance value, the compensated resistance value having corrected therein an error of the detected resistance value due to variation in temperature,
   wherein the drive control portion controls the drive control value such that the compensated resistance value is equal to a target resistance value that indicates a resistance value of the shape memory alloy corresponding to the target displacement value, and
   wherein the compensation calculation portion calculates the compensated displacement value by use of a displacement detection term, in which the detected displacement value is subjected to calculation using a constant or function, and a temperature compensation term, in which the drive control value is subjected to calculation using a constant or function, and the compensation calculation portion sets the constant or function such that the temperature compensation term has a comparatively small value than the displacement detection term.

2. The shape memory alloy driver according to claim 1, further comprising a filter portion for restricting an upper limit of a control frequency range of an output signal of the drive control portion fed from the drive control portion to the compensation calculation portion.

3. The shape memory alloy driver according to claim 1, further comprising a hold portion for making the drive control value, which is fed from the drive control portion to the compensation calculation portion, a fixed value.

4. The shape memory alloy driver according to claim 1, wherein the compensation calculation portion performs compensation calculation of the displacement error by use of a hysteresis correction value calculated based on a control history of the drive control portion.

5. A shape memory alloy driver comprising:
a displacement detection portion for detecting displacement of a shape memory alloy; and
a drive control portion for applying a voltage or current to the shape memory alloy such that a detected displacement value that indicates displacement detected by the displacement detection portion is equal to a target displacement value, and
a compensation calculation portion for calculating a compensated target displacement value based on a target displacement value and on the drive control value, the compensated target displacement value compensating for a displacement error of the target displacement value due to variation in temperature,
wherein the drive control portion controls the drive control value such that the detected displacement value is equal to the compensated target displacement value,
wherein the displacement detection portion detects resistance of the shape memory alloy to thereby acquire a detected resistance value,
wherein the compensation calculation portion calculates a compensated resistance value based on the drive control value and on the detected resistance value, the compensated resistance value having corrected therein an error of the detected resistance value due to variation in temperature,
wherein the drive control portion controls the drive control value such that the compensated resistance value is equal to a target resistance value that indicates a resistance value of the shape memory alloy corresponding to the target displacement value, and
wherein the compensation calculation portion calculates the compensated displacement value by use of a displacement detection term, in which the detected displacement value is subjected to calculation using a constant or function, and a temperature compensation term, in which the drive control value is subjected to calculation using a constant or function, and the compensation calculation portion sets the constant or function such that the temperature compensation term has a comparatively small value than the displacement detection term.

6. The shape memory alloy driver according to claim 5, further comprising a filter portion for restricting an upper limit of a control frequency range of an output signal of the drive control portion fed from the drive control portion to the compensation calculation portion.

7. The shape memory alloy driver according to claim 5, further comprising a hold portion for making the drive control value, which is fed from the drive control portion to the compensation calculation portion, a fixed value.

8. The shape memory alloy driver according to claim 5, wherein the compensation calculation portion performs compensation calculation of the displacement error by use of a hysteresis correction value calculated based on a control history of the drive control portion.

* * * * *